Jan. 3, 1933.  A. GROSBOST  1,892,834
FLYING SHEARS
Filed Oct. 12, 1929  9 Sheets-Sheet 1
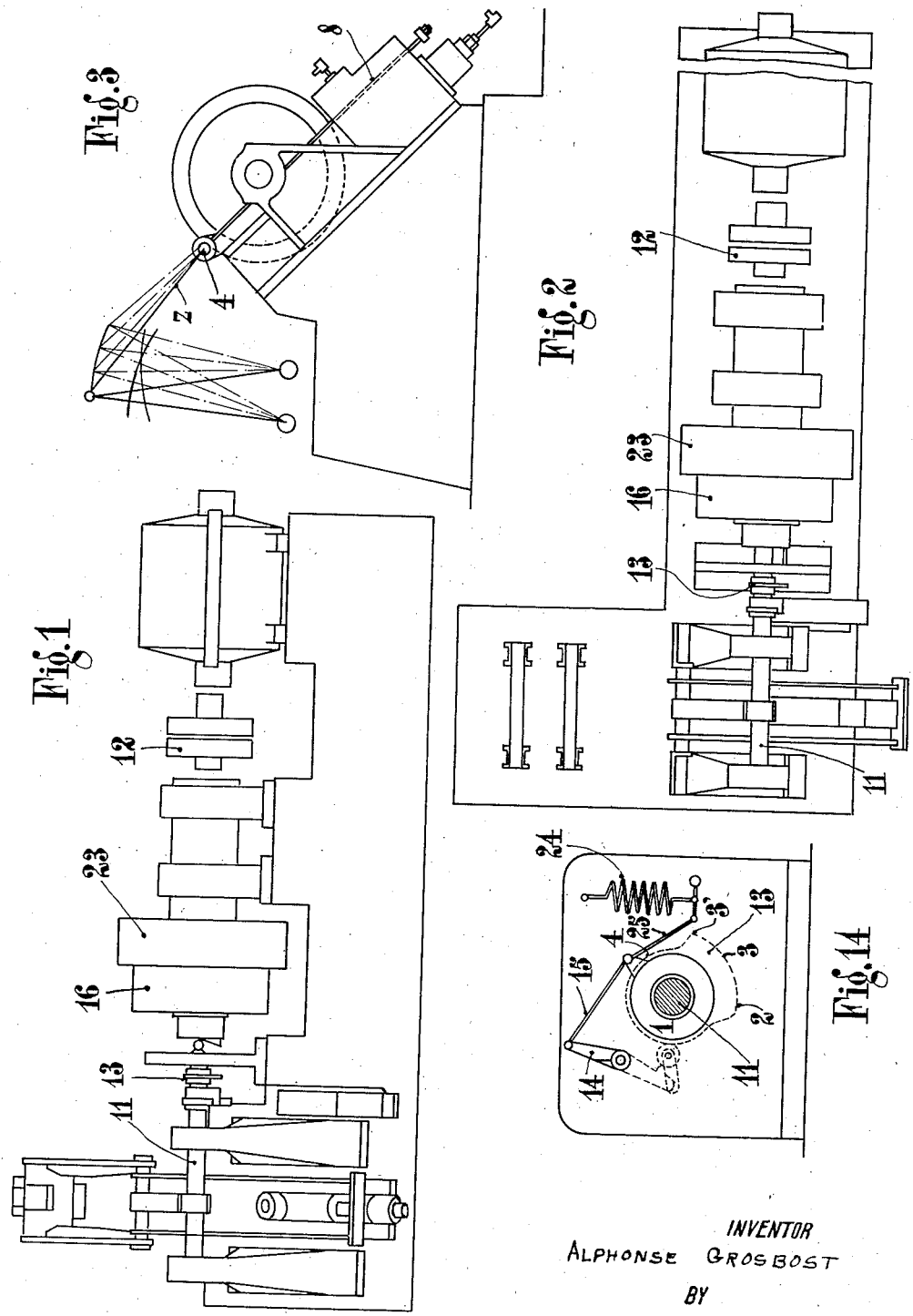
INVENTOR
ALPHONSE GROSBOST
BY
Emil Bönnelycke
ATTORNEY Jan. 3, 1933.  A. GROSBOST  1,892,834
FLYING SHEARS
Filed Oct. 12, 1929  9 Sheets-Sheet 2
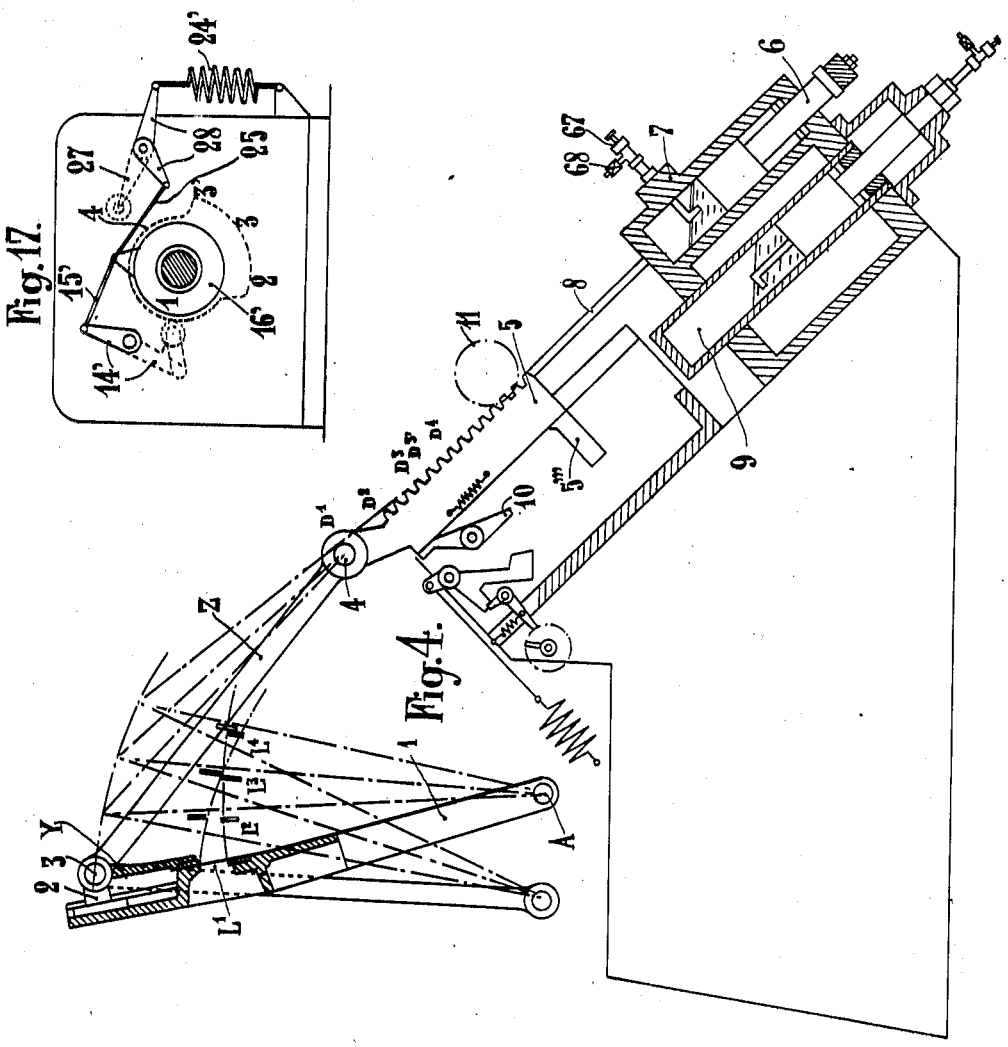
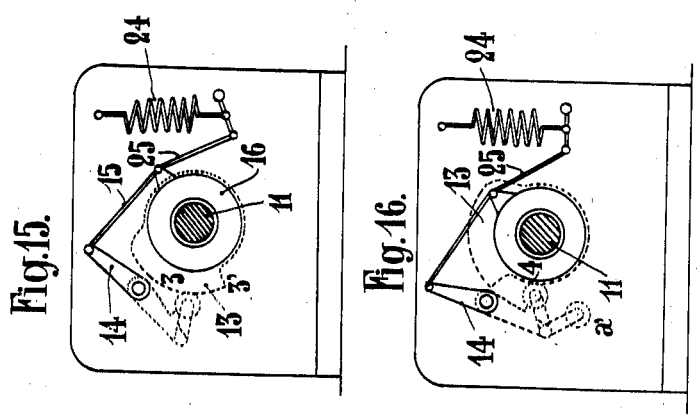
INVENTOR
ALPHONSE GROSBOST
BY
Emil Bönnelycke
ATTORNEY

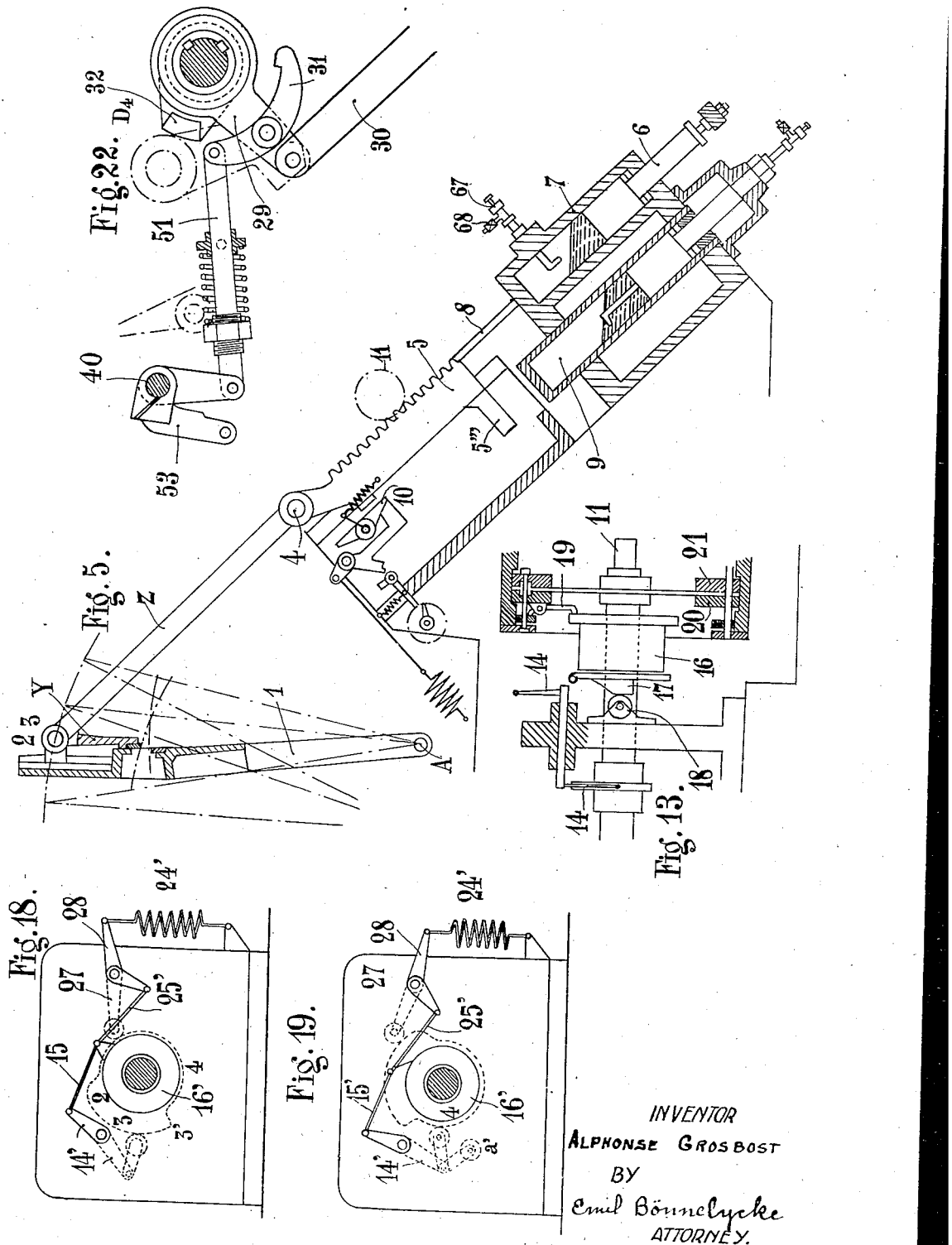

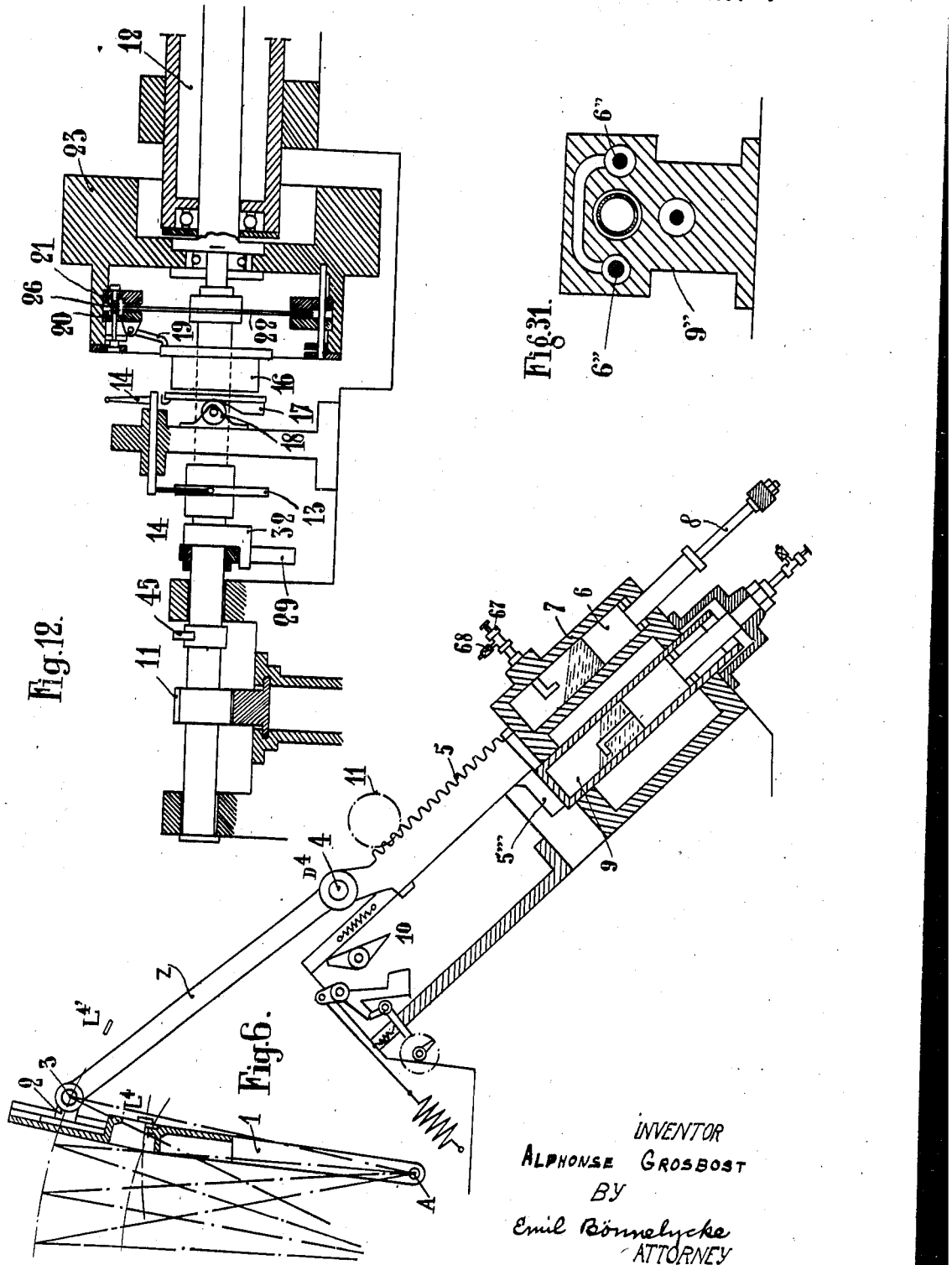

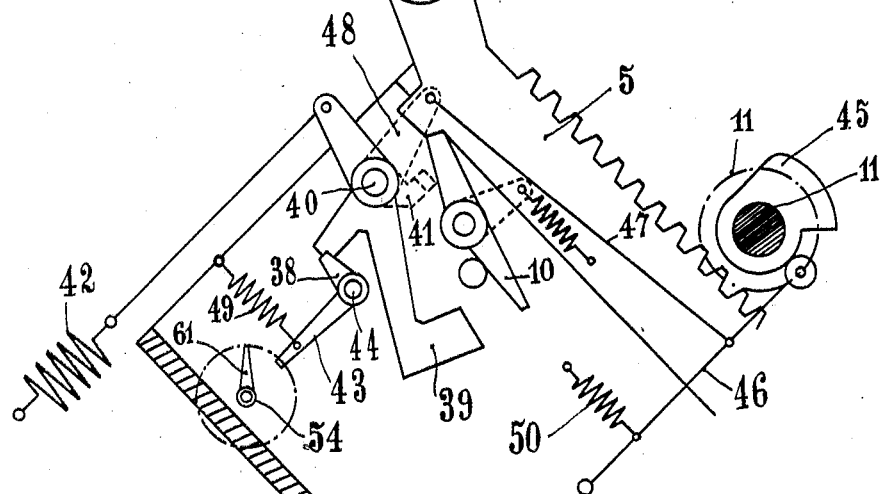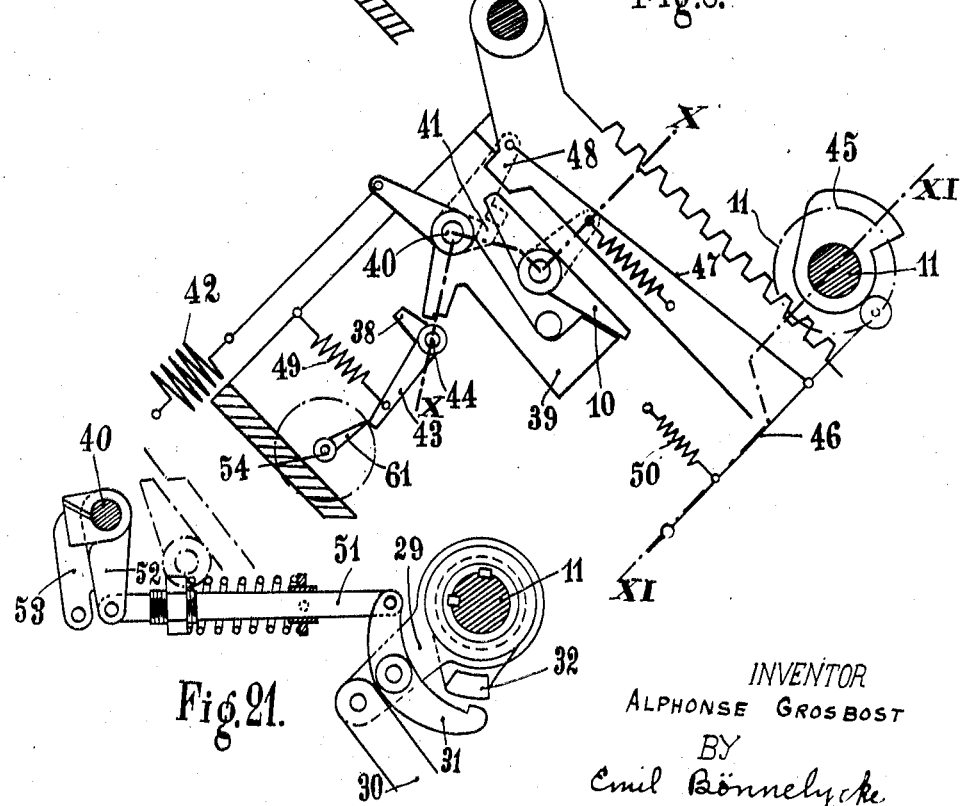

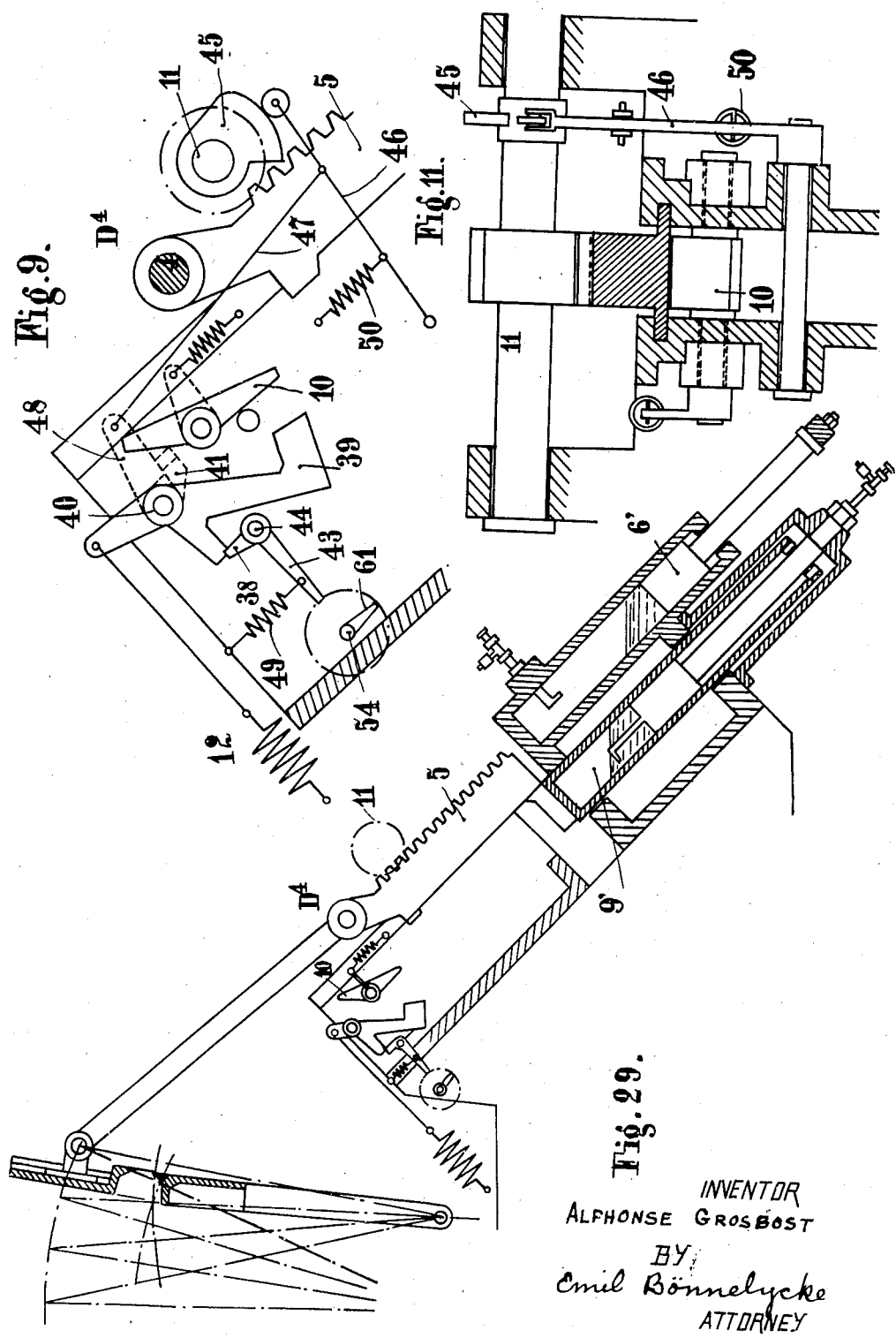

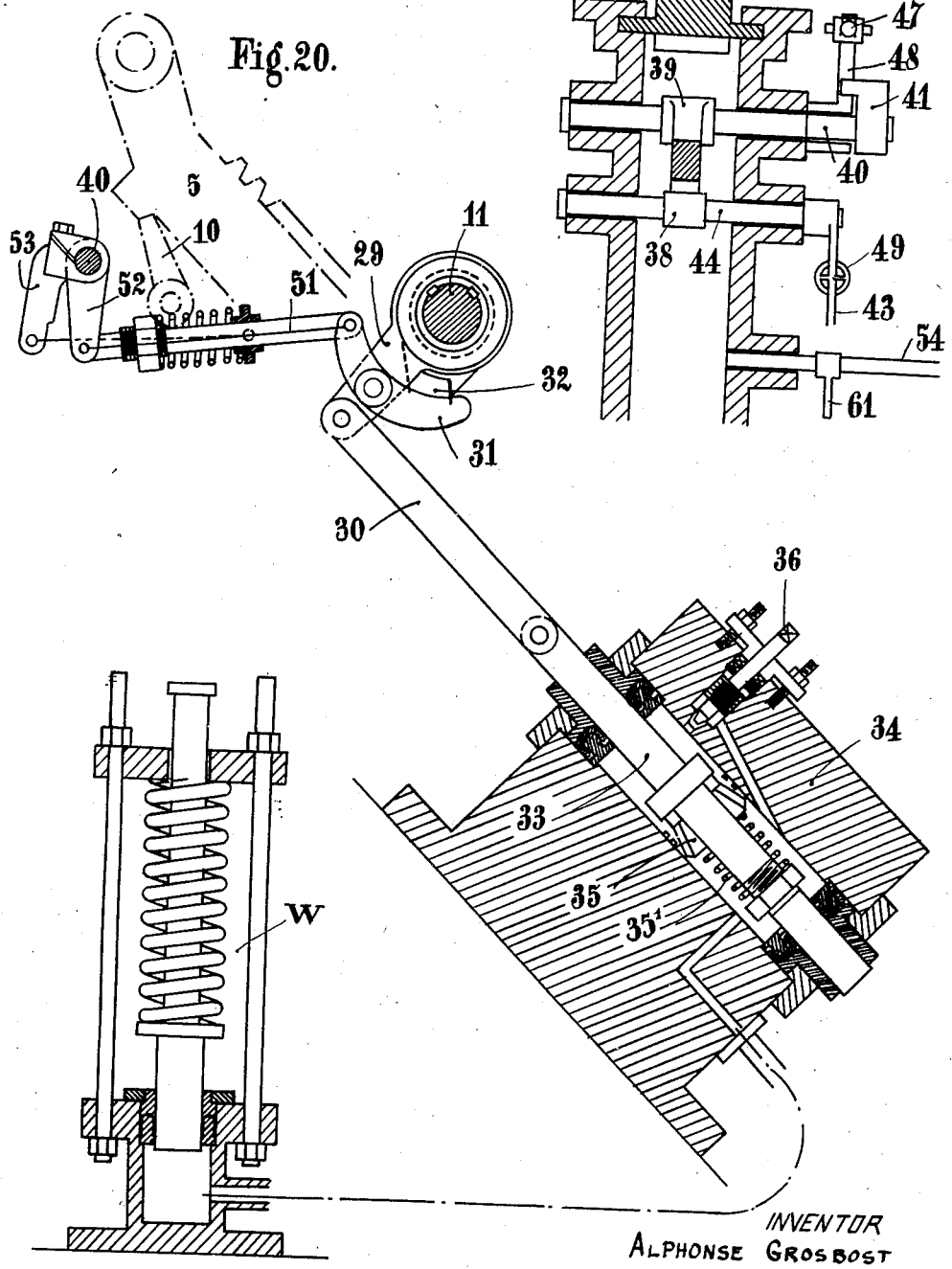

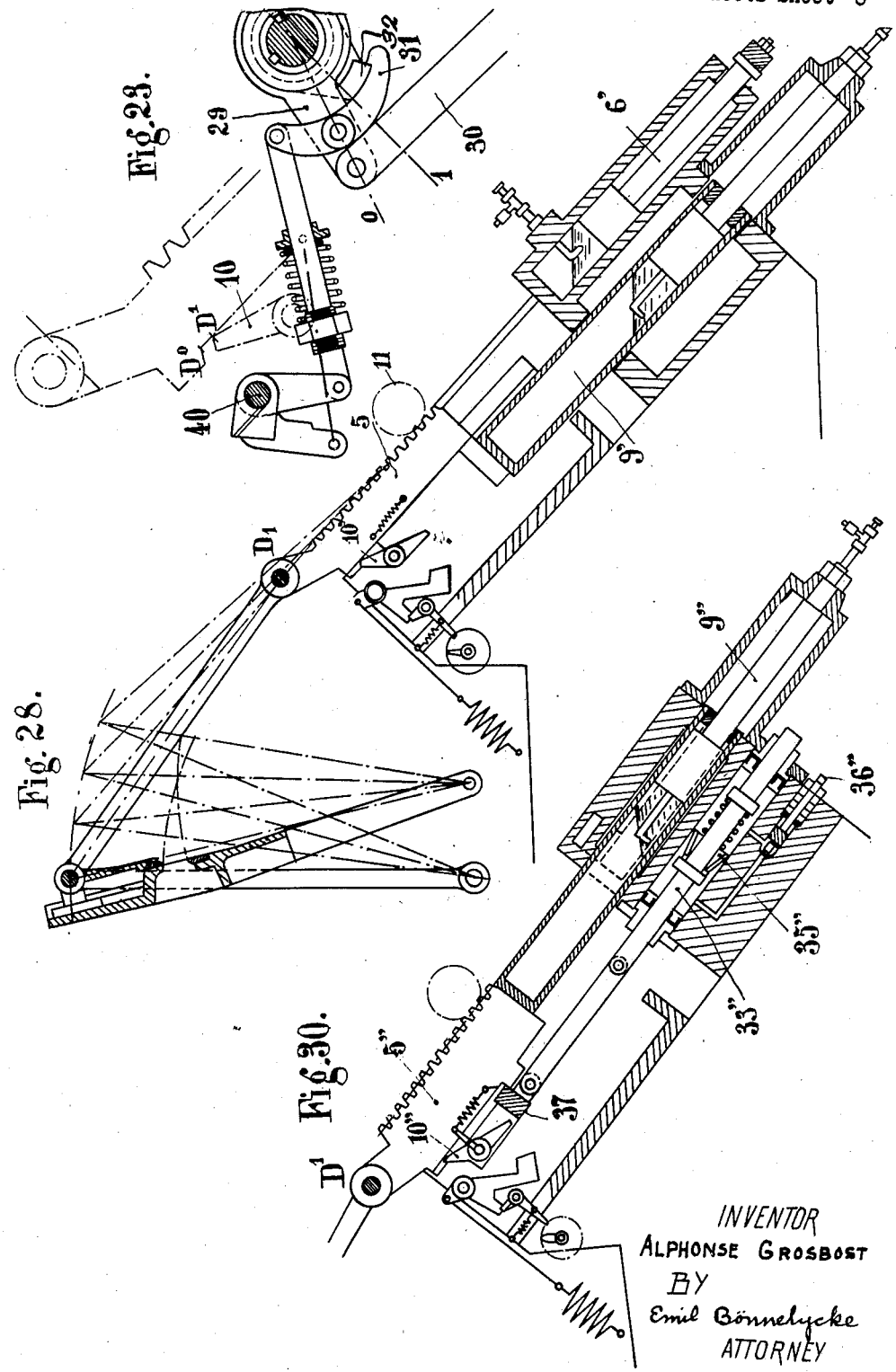

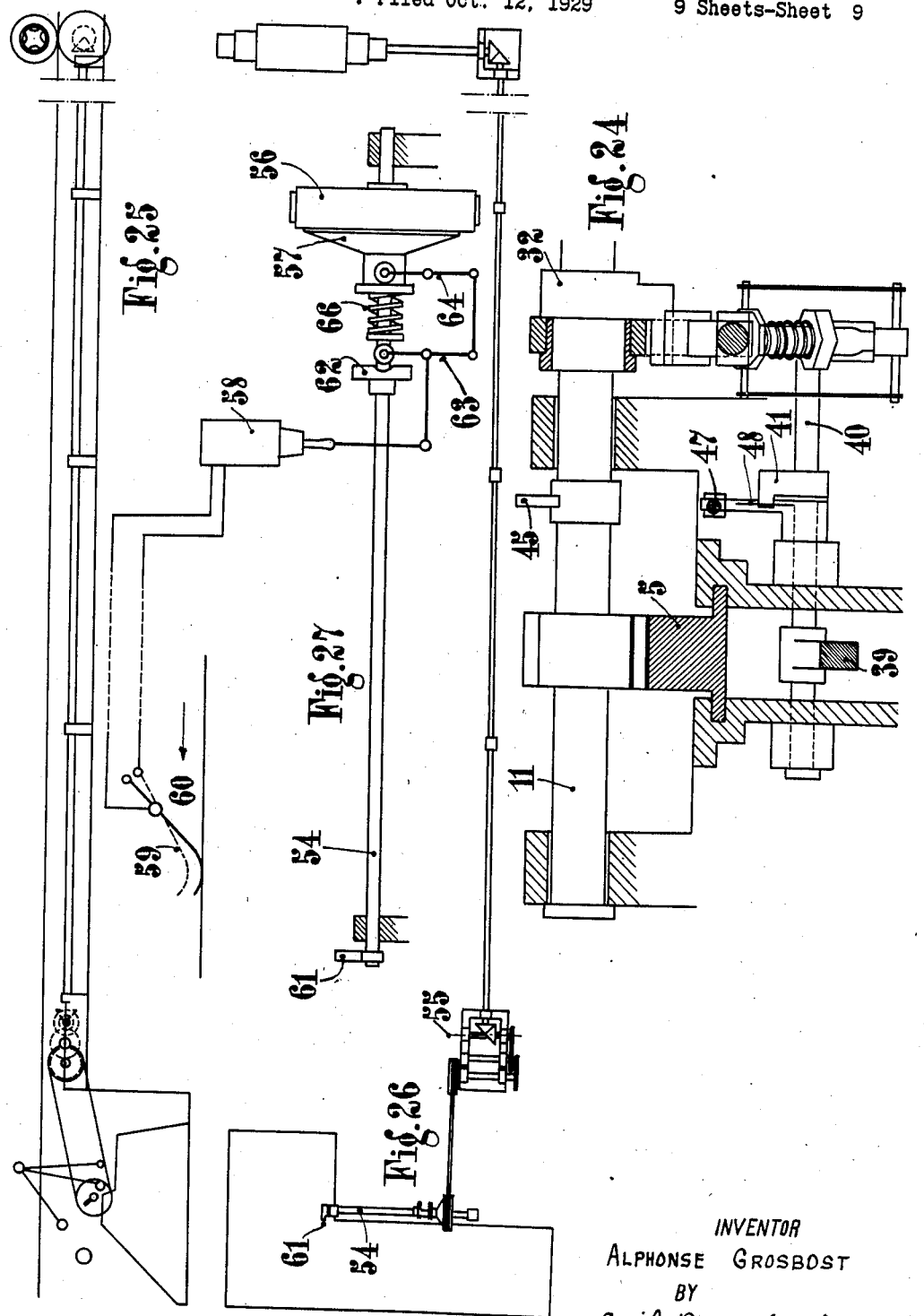

Patented Jan. 3, 1933

1,892,834

UNITED STATES PATENT OFFICE

ALPHONSE GROSBOST, OF PARIS, FRANCE, ASSIGNOR OF ONE-HALF TO SOCIÉTÉ D'ETUDES & DE CONSTRUCTIONS METALLURGIQUES, OF PARIS, FRANCE, A CORPORATION OF FRANCE

FLYING SHEARS

Application filed October 12, 1929. Serial No. 399,339.

The object of flying shears is to shear bars moving from a rolling mill without the necessity of bringing the bars to a standstill. The blades effectuate the cutting of the shears while the blade holders are moving in the direction of motion of the bars and at the same speed.

The present invention has for its object to realize a mechanism for actuating the flying shears of the type above referred to.

In order to make my invention more clearly understood I have illustrated, as an example, an embodiment thereof in and by drawings appended hereto and wherein:

Figures 1 to 3 show diagrammatically in elevation, side view and plan view an embodiment of the shears constructed in accordance with my invention;

Figures 4 to 6 illustrate in three different positions the shear controlling mechanism;

Figures 7 to 9 illustrate the control mechanism, locking and releasing device in different positions;

Figures 10 and 11 are two sectional views taken through, respectively, lines X—X and XI—XI of Figure 8;

Figures 12 to 16 show details of the clutch;

Figures 17 to 19 relate to a modification wherewith the clutch is mechanically controlled;

Figures 20 to 24 illustrate an embodiment of a hydraulic shock absorber;

Figures 25 to 27 show the device provided for cutting bars in predetermined lengths;

Figures 28 and 29 are illustrative of modifications of the mechanism shown by Figures 4 to 6, the starting and braking device of these modifications consisting of two cylinders that operate through pressure difference;

Figures 30 and 31 show the same mechanism combined with a hydraulic shock absorber that operates the bolt of the rack.

Figures 4 to 6, illustrating the various relative positions of the cutting blades, will be first considered.

The machine being at rest and the blades in position $L^1$, the following operations have to be effectuated, to wit:

The blades must move from position $L^1$ towards position $L^2$ at an increasing speed which must, at $L^2$, be equal to the speed of the bar X to be sheared; from $L^2$ to $L^3$, during which travel the cutting takes place, the speed must remain constant and equal to the speed of the bar so as to effect a clean cut without unduly stressing the bar. At $L^3$ the upper blade-holder pivots round spindle 3 in order to be out of the way of bar X which is then on the left hand side of Figure 4. From $L^3$ to $L^4$ the speed decreases down to nil, the upper blade pivoting round spindle 3 to reach $L^4$.

According to my invention, the braking energy is recovered in order to return the machine to initial position and is stored so as to provide for acceleration from $L^1$ to $L^2$ during the next stroke. The braking energy being equal to the accelerating energy, except for friction, it will be apparent that control of the machine may be divided into two portions, that is to say, effectuated by two separate devices:

1. A resilient device permitting the storing of energy and releasing the same in order to accelerate the machine when the blades are moving from position $L^1$ to position $L^2$; afterwards recovering energy from $L^3$ to $L^4$ while braking the machine; then releasing it anew from $L^4$ to $L^3$ in the opposite direction at the beginning of the return travel; and lastly, storing energy again from $L^2$ to $L^1$ ready for another cutting operation, the machine having returned to initial position.

2. An automatic device adapted to provide, while the blades are moving from $L^2$ to $L^3$, the energy required to shear the bar and to impart a constant speed, this system remaining inoperative during the return travel from $L^3$ to $L^2$.

The various above described movements are accurately obtained by means of the mechanisms illustrated by Figures 4 to 16.

As with prior similar machines, a lower blade-holder 1 is adapted to rock at A. A cross-head 2 carries the spindle 3 on which are adapted to rock the upper blade-holder Y and the operating connecting rods Z. At 4 is pivotally mounted a slide bar 5 which slides within a fixed part of the frame; one of the faces of said slide bar is cut as a rack. Point 4 is adapted to occupy successively positions $D^1$, $D^2$, $D^3$, $D^4$ corresponding to positions $L^1$, $L^2$, $L^3$, $L^4$ of the shear blades. Slide bar 5 is taken from $D^1$ to $D^2$ by piston 6 reciprocated within cylinder 7 by fluid under pressure; two connecting rods 8, attached at 4, connect the rack with the piston. Slide bar 5 has its lower part formed within a heel $5'''$ which, during the travel from $D^3$ to $D^4$, comes into contact with a braking cylinder 9 that contains compressed gas (Figure 6).

A certain amount of liquid is interposed as a seal between the gas and the pistons so as to avoid leakage.

A drain gauge 67, of well known type, permits controlling the liquid level, while a cock 68, located at the end of gauge 67, allows liquid and gas to be introduced into the cylinders.

A click bolt 10 permits holding the slide bar in position $D^1$ as shown by Figure 4. In this position the gas contained in cylinder 7 is compressed by piston 6.

When bolt 10 is released, under the push of piston 6, the whole system moves from position $L^1$ and $D^1$ to position $L^2$ and $D^2$ whereat it should attain the desired speed, which speed is adjustable according to pressure. Piston 6 ceasing to take action at $L^2$ and $D^2$, the system moves from $L^2$, $D^2$ towards $L^3$, $D^3$ at a constant speed. At $L^3$, $D^3$ the heel $5'''$ of slide bar 5 comes into contact with the braking cylinder 9 and compresses the gas contents thereof until $L^4$, $D^4$ is reached, whereat the kinetic energy of the system should be completely absorbed. Since nothing opposes the back travel of rack 5, cylinder 9 returns the system from $L^4$, $D^4$ to $L^3$, $D^3$, then the movement continues from $L^3$, $D^3$ to $L^2$, $D^2$ and, lastly, piston 6 compresses the gas contents of cylinder 7 until $L^1$, $D^1$ is reached, that is to say until return to initial position, whereat the system is arrested by bolt 10 which is automatically caused to catch.

Some of the energy being lost through friction, it is obvious that in order to ensure return to initial position I must get from the motor, besides the energy required for the cutting operation, extra energy to make up for losses.

In order to connect the above described apparatus with the driving motor, I cause rack 5 to mesh with a pinion 11 that rotates between two bearings integral with the fixed frame of the machine.

Said pinion may be rendered, by means of a clutch, integral with a shaft 12 positioned in a line therewith. The clutch shown by Figures 12 and 13 is a plate clutch but any type of clutch will do.

Automatic timing of the throwing of the clutch into and out of gear is effectuated (Figures 12 to 16) by means of a cam 13 integral with pinion 11. Figures 14 to 16 illustrate three relative positions of the clutch mechanism. When rack 5 is released by bolt 10 under the push of piston 6, said rack moves from $D^1$ towards $D^2$ (Figure 4), taking along pinion 11 and, consequently, cam 13. On reaching towards $D^2$ cam 13 pushes a roller carried by a lever 14 which, through connecting rod 15, causes an angular movement of a coupling box 16, which movement is transformed into an axial movement by a wedge or gradient 17 which rides on a roller 18 carried by a fixed member of the frame.

Coupling box 16, taking action on a series of levers 19, causes tightening of plates 20 and 21 taken along by the flywheel 23 on disk 22 integral with pinion 11 (Figure 13). From this moment shaft 12 becomes motive up to 3. The movement from 2 to 3 will be effectuated at a constant speed under the influence of the motor and of flywheel 23, the kinetic energy of which is enormously greater than the power required. On reaching 3 the roller rides off the raised portion of cam 13 and, through connecting rod 25, a spring returns coupling box 16 to initial position. Springs 26 then push disks 20 and 21 (Figure 12) apart, thereby releasing pinion 11 from the driving shaft 12.

From 3 to 4, the system is braked by cylinder 9 which causes immediate return from 4 to 3; when 3 is reached, the raised part of cam 13 comes to strike against the roller carried by lever 14, the tip of which moves to $a'$ (as shown by Figure 16), without throwing the clutch into gear, and then goes on from 2 to 1 whereat the system gets bolted again.

For the purpose of restoring to the apparatus the energy lost through friction during the various acceleration and braking periods, point 3 (Figure 18) on cam 13 will be carried up to $3'$, during which period the motor and the flywheel compress cylinder 9, providing it with energy to make up for losses due to body resistances.

The set of those two systems, compressed air cylinders and clutch, affords means perfectly adapted to effectuate the motion contemplated.

Figures 17 to 19 illustrate a modification of the coupling box returning device 16. When the rack, moving from $D^3$ towards $D^4$, arrives at $D^{3'}$ (Figure 19), cam 13 pushes back the roller carried by lever 27 integral with fastening lever 28 of spring 24'. In this manner return of the coupling box is obtained mechanically, spring 24' merely assisting the motion.

In the case it is desired to vary within certain limits and with the same apparatus the speed during the working travel from $D^2$ to $D^3$, I have but to use a variable speed motor to drive shaft 12 and to vary the pressures in the starting and in the braking cylinders in order that the system be started at a speed substantially equal to the speed provided by the motor at the time when the clutch is thrown into gear.

The energy supplied to the braking cylinder to overcome friction is governed:

1. By the motion of the cam profile from 3 to 3',
2. By the pressure within cylinder 9 during that time.

If I desire to use the machine for different speeds, I have already shown that the pressures should be adjusted in ratio of the speed to be obtained.

As a result of this fact, if I cause the speed to be varied while keeping the shifting from 3 to 3', the energy supplied will vary in the same direction as the speed. The body resistances not being proportional to pressures, if the speed is decreased the energy will be inadequate.

If the speed is increased, the energy will be overgreat and the machine will outpass its initial position $D^1$ and reach $Do$ (Figure 23). Since nothing will further oppose the reverse motion, the machine will go back from $Do$ to $D^1$ at an increasing speed and hit hard on bolt 10.

This consideration leads to an accurate adjustment of the period from 3 to 3' on cam 13 respective the pressure in the cylinder.

In practice, such an adjustment is somewhat delicate and involves a loss of time.

Figures 20 to 24 illustrate a hydraulic shock absorber designed to obviate these drawbacks.

With said device the period from 3 to 3' on the cam is adjusted for a certain speed and remains constant for all and any speeds at which the machine may be operated.

Lever 29, mounted loose on pinion shaft 11, is connected by means of a connecting rod 30 to a hydraulic brake. A bolt 31, integral with lever 29, is adapted to engage a thrust block 32 keyed on said pinion-shaft 11.

When, during its return travel or stroke, the whole system is moving from $D^2$ towards $D^1$, the thrust block 32 will first lower bolt 31 which will automatically catch when the machine arrives at $D^1$.

If the energy is not completely absorbed, the rack will come up to $Do$ (Figure 21), and then thrust block 32 will, through lever 29 and connecting rod 30, drive piston 33. The liquid contained in cylinder 34 will move from front to back, lifting valve 35. When the kinetic energy is completely absorbed valve 35 is seated under the action of spring 35', the rack driven by the starting piston 6 comes down again from $Do$ towards $D^1$, and lever 29, rendered integral with thrust block 32 by bolt 31, drives the piston 33 by means of connecting rod 30. Valve 35, being seated, compels the liquid to flow out through an outlet adjustable by means of needle 36. I am thus enabled to adjust or regulate the return speed in such a way that rack 5 will come to rest without a jar on bolt 10.

In order to prevent what slight liquid leakage might occur, the damping cylinder communicates with a hydraulic accumulator W (Figure 20).

Bolt 31 is released at the same time as bolt 10 releases rack 5 (Figures 8 and 22).

Figures 28 and 29 illustrate a modification of the device shown by Figures 4 to 6. The starting piston 6' and the braking cylinder 9', the action of which is contrary, have a travel equal to the travel of rack 5'. Starting and braking are caused by higher pressure alternately obtaining in either of these cylinders.

Figures 30 and 31 illustrate the same system in combination with a hydraulic shock absorber taking direct action on bolt 10" of rack 5".

As concerns construction, 6" are two starting cylinders put into communication at their upper part and arranged on either side of the braking cylinder 9" (Figure 31).

The hydraulic shock absorber, identically similar to the one shown on Figure 20, is connected through a connecting rod to a sledge 37 adapted to slide in a fixed part of the frame and carrying the bolt 10" of rack 5". When rack 5" gets beyond its initial position, a heel, located at the lower part of said rack, drives sledge 37 in the direction of the motion and takes along piston 33" of the hydraulic shock absorber. When the kinetic energy of the system has been completely absorbed, valve 35" is seated. The rack, driven by pistons 6", comes down again taking along through bolt 10", which has automatically become engaged thereby, the rod of the damping piston 33". Resting on its seat, the valve compels the liquid to flow through an outlet adjustable by means of a needle 36". I am, in this manner enabled, to adjust or regulate the return speed and to cause the return to be effectuated without a jar.

Figures 7 to 11 illustrate the releasing device for bolt 10 that retains the shears in initial position.

A bolt 38 retains a hammer 39 integral with a spindle 40 and with a lever 41 influenced by a spring 42.

When a finger 61, carried by a shaft 54, comes to push back lever 43, rendered integral with bolt 38 by spindle 44, hammer 39 is released. Under the influence of spring 42, said hammer is caused to strike bolt 10, thereby releasing rack 5 which moves from D' towards D⁴. (Figure 9.)

During this travel, cam 45, driven by pinion 11, pushes back the roller carried by lever 46 which, through connecting rod 47, pulls lever 48. This lever, loose on spindle 40, comes to thrust against lever 41 which it operates, thereby returning the whole system to initial position (Figure 9).

Finger 61 having let go lever 43, the latter is returned by spring 49, and bolt 38 gets automatically caught.

During the return travel from D⁴ to D¹, a spring 50 returns lever 46, connecting rod 47 and lever 48 to initial position. (Figure 7.)

When the rack has returned to D¹, bolt 10 becomes automatically set in position.

The system is then ready to operate another cut when finger 61, continuing its cycle, will come anew to push lever 43.

When the machine makes use of a hydraulic shock absorber, bolt 31 of the absorber (Figures 20 and 21) is released at the same time as bolt 10 of the rack.

Bolt 31 is connected by a connecting rod 51 to a lever 52 loose on spindle 40 of the releasing hammer (Figures 7 and 20). When hammer 39 (Figures 8 and 10) is released, lever 53 (Figure 21), keyed on spindle 40, drags lever 52 which, through connecting rod 51, causes bolt 31 to be freed. When the rack moves from D¹ towards D⁴, the system returns to position (Figure 22) under the action of spindle 40 the operation of which has been hereinbefore explained. The system will thus be ready to act again when the rack, moving from D⁴ towards D¹, will have reached D¹, as has been explained in reference to operation of the hydraulic shock absorber.

The above described machine is completed by a device adapted to permit automatically cutting in commercial lengths bars coming from a rolling mill, without having to stop the same.

Figures 25 and 26 are a general diagram of the shear releasing control.

The lengths to be cut being a function of the angular displacement of the rolls, the mill synchronically drives, by means of suitable gears and transmissions, a revolving shaft 54 the number of revolutions of which respective the mill may be varied by means of a speed gear box 55 fitted with interchangeable gears.

Figure 27 shows, on an enlarged scale, the revolving shaft 54. A cone clutch, the idle pulley 56 of which is permanently driven by the train, is adapted to transmit its motion to cone 57 keyed on shaft 54 when is caused to act an electro-magnet 58 the weight of the core of which keeps the cone out of engagement.

On leaving the shears, the bar lifts a shutter 59, adapted to swing round a spindle positioned at a suitable distance. This movement makes a circuit that causes the magnet to be lifted, thereby releasing cone 57 which, under the action of spring 66, comes into engagement with pulley 56. Shaft 54 is driven during the whole time the bar passes under shutter 59. Finger 61, keyed on shaft 54, comes, at each revolution of the latter, to push back lever 43 (Figures 7 to 10) causing the shears to be released. The length of the first bar is governed by the position of the shutter respective the shears.

The device so constructed enables me either to crop the end of the bar or to shear direct to any desired length, and the cuts then succeed one another to cut up the bars in regular lengths.

When the bar, entirely cut up, has been fed beyond shutter 59, the latter falls back, thereby opening the circuit wherein the electromagnet is inserted.

The throwing out of gear having to be effectuated in a fixed position, cannot take place unless a cam 62, keyed on shaft 54, permits the core of the electromagnet to return through levers 63 and 64 and through connecting rod 65, the driving cone 57.

I wish it to be clearly understood, that, while I have hereinbefore described and illustrated a preferred embodiment, constructional modifications and/or alterations may be introduced without departing from the scope of my invention.

Having now particularly ascertained and described the nature of my said invention as well as the manner in which the same is to be performed, I declare that what I claim is:

1. In a device for shearing moving bodies, a source of motive power, a shaft adapted to rotate alternately and to be energized from the source of motive power, a plurality of shearing blades adapted to effect a shearing operation, said blades being actuated by the rocking of the shaft, and means for storing the kinetic energy of the movable parts of the apparatus during the shearing operation and for restoring it to the movable parts during the return operation.

2. The device set forth in claim 1, wherein the means for storing and restoring the kinetic energy of the moving parts comprising a pinion on the shaft, a slide rack actuated by movement of the pinion, said slide rack being connected with the shearing blades, and a fluid reservoir for storing and restoring the energy, said reservoir containing a piston which is connected with the slide rack so that reciprocating movement of the slide rack to effect the cutting operation will alternately compress the fluid in the reservoir.

3. The device set forth in claim 1, including means for transferring energy from the source of energy to the machine to compensate for the friction loss, said means comprising a cam on the shaft, and a device actuated by the cam for engaging the source of energy with the shearing blades during the shearing operation.

4. The device set forth in claim 1, including a pneumatic damper connected to the shearing blades for cushioning the movement of the shearing blades at the end of their stroke.

In testimony whereof, I affix my signature.

ALPHONSE GROSBOST.